United States Patent
Abrahams et al.

(10) Patent No.: US 8,640,082 B2
(45) Date of Patent: Jan. 28, 2014

(54) SPECIFYING DATA OCCURRENCE IN SOA BASED ENVIRONMENTS

(75) Inventors: Faried Abrahams, Laytonsville, MD (US); Kerard R. Hogg, Riddells Creek (AU); Gandhi Sivakumar, Victoria (AU)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 13/221,977

(22) Filed: Aug. 31, 2011

(65) Prior Publication Data
US 2013/0055193 A1 Feb. 28, 2013

(51) Int. Cl.
G06F 9/44 (2006.01)

(52) U.S. Cl.
USPC .......................................................... 717/100

(58) Field of Classification Search
USPC .......................................................... 717/100
See application file for complete search history.

(56) References Cited

U.S. PATENT DOCUMENTS

| | | | |
|---|---|---|---|
| 7,840,669 B2 | 11/2010 | Dutta et al. | |
| 2005/0132381 A1* | 6/2005 | Fiammante et al. | 719/310 |
| 2008/0046259 A1* | 2/2008 | Johnston | 705/1 |
| 2008/0140759 A1 | 6/2008 | Conner et al. | |
| 2009/0138293 A1 | 5/2009 | Lane et al. | |
| 2009/0172012 A1 | 7/2009 | Chellam et al. | |
| 2010/0138252 A1 | 6/2010 | Brown et al. | |

FOREIGN PATENT DOCUMENTS

EP 1970802 9/2008

OTHER PUBLICATIONS

Deutsche Wikipedia zum Begriff Review (Softwaretest). Jan. 29, 2013, retrieved from the Internet:< URL: http://web.archive.org/web/201 00819000231/http://de.wiki pedia. org/wikiIReview_>, 4 pages.
A. Arsanjani et al: SOMA: A method for developing service-oriented solutions. In: IBM Systems Journal, vol. 47, No. 3, 2008, Retrieved from the Internet: < URL: http://ieeexplore.ieee.org/stamp/stamp.jsp?tp=&arnumber=5386496&isnumber=5386495>, pp. 377-396.
David Binkley: Source Code Analysis: A Road Map. In: Future of Software Engineering, 2007, FOSE '07. 0-7695-2829-5/07, IEEE Computer Society, Retrieved from the Internet:< URL: http://ieeexplore.ieee.org/stamp/stamp.jsp? tp=&arnumber=4221615 &isnumber=4221601>, 16 pages.
Jasmine Noel: BPM and SOA: Better Together. 2005. Retrieved from the Internet: <URL: http://www-05.ibm.com/hu/news/events/2007/akademia/pdf/SOA-BPM.pdf> pp. 1-12.

(Continued)

*Primary Examiner* — Li B Zhen
*Assistant Examiner* — Bradford Wheaton
(74) *Attorney, Agent, or Firm* — Schmeiser, Olsen & Watts; John Pivnichny

(57) ABSTRACT

A method and system for specifying a data occurrence in a service-oriented architecture based environment. After a service specification phase of a service, a service interface is received and a service implementation is created. During a service realization phase, a data element of the service is determined to be sourced or not sourced by the service implementation. If the data element is sourced, then the data element is determined to be optional. If the data element is not sourced, then the data element is determined to be mandatory. The data occurrence including an indication of whether the data element is optional or mandatory is displayed. The service specification phase is repeated and the service interface is modified based on the displayed data occurrence.

20 Claims, 5 Drawing Sheets

(56) References Cited

OTHER PUBLICATIONS

Josip Zoric et al: Service Mobility—a challenge for semantic support, Retrieved from the Interent:< URL: http://ieeexplore.ieee.org/stamp/stamp.jsp?tp=&arnumber=4299100&isnumber=4299029>, pp. 1-8.

AU920110008DE1DE1, Office Action Mail Date Feb. 1, 2013, 8 pages.

Intellectual Property Office Combined Search and Examination Report; Mail Date Oct. 12, 2012; Patent Application No. GB1210488.1; 8 pages.

Zhou et al., Assessment of Service Protocols Adaptability, Source: On the Move to Meaningful Internet Systems: OTM 2009, Proceedings Confederated International Conferences CoopIS, DOA, IS and ODBASE 2009, 31 pages, Publisher: Springer Verlag, Berlin, Germany.

* cited by examiner

SPECIFYING DATA OCCURRENCE IN SOA BASED ENVIRONMENTS

TECHNICAL FIELD

The present invention relates to a data processing method and system for specifying data optionality in a service-oriented architecture, and more particularly to a technique for specifying whether a data element of a service is optional or mandatory using information from the realization phase of the service in the development lifecycle.

BACKGROUND

In service-oriented architecture (SOA) based integration environments, services created as "integration enablers" aid the integration between consumer and provider applications. Depending on the pattern of integration, such service integration enablers reside in middleware or in designated applications. In known SOA scenarios, data optionality is defined manually during the service specification phase. Data optionality is defined in a limited manner by accounting merely for the service specification phase. Defining data optionality by considering only the service specification phase drives the interface to become flavored by provider or consumer applications, which in turn results in a rigid interface. Thus, as new applications are introduced, the service component becomes unusable. An SOA based environment is hierarchical; i.e., there may be multiple layers in the hierarchy of the SOA based environment. Services in the upper layers of the hierarchy may consume services in the lower layers of the hierarchy. Defining data optionality using known manual methods is a complex task across the hierarchies. Thus, there exists a need to overcome at least one of the preceding deficiencies and limitations of the related art.

BRIEF SUMMARY

Embodiments of the present invention provide a method of specifying a data occurrence in a service-oriented architecture based environment. The method comprises:
a computer receiving a tentative specification of an interface (service interface) of a service in the SOA based environment based on a completion of an initial service specification phase of the service;
after the initial service specification phase and during a service realization phase of the service, the computer making a determination about a source of a data element of the service, wherein a result of the step of making the determination is determining the data element of the service is sourced or not sourced by an implementation (service implementation) of the service;
the computer determining the data element is optional if the step of making the determination results in determining the data element is sourced by the service implementation;
the computer determining the data element is mandatory if the step of making the determination results in determining the data element is not sourced by the service implementation;
the computer initiates a display of the data occurrence, wherein the data occurrence includes an indication that the data element is optional if the step of making the determination results in determining the data element is sourced by the service implementation or an indication that the data element is mandatory if the step of making the determination results in determining the data element is not sourced by the service implementation;
repeating the service specification phase based on the display of the data occurrence; and
in response to repeating the service specification phase, the computer modifying the specification of the service interface based on the display of the data occurrence.

A system, program product and a process for supporting computing infrastructure where the process provides at least one support service are also described and claimed herein, where the system, program product and process for supporting computing infrastructure correspond to the aforementioned method.

Embodiments of the present invention provide a technique for automatically specifying a data occurrence in a service-oriented architecture environment that provides a robust, non-rigid service interface and an accurate definition of data occurrence, thereby promoting reusability of a service when a new consumer application and/or a new provider application is introduced.

DETAILED DESCRIPTION OVERVIEW

Embodiments of the present invention may provide a method and system in a service-oriented architecture (SOA) environment for specifying a data occurrence. In one embodiment, a data occurrence associated with a service may be automatically specified after the service realization phase is completed by accounting for service dependencies and based on the code included in the service implementation, and by reiterating the service specification phase. Embodiments presented herein may facilitate reusability of a service in response to an introduction of a new consumer application or a new provider application.

Phases in an SOA modeling life cycle (1) service identification, (2) service specification, (3) service realization, and (4) service implementation and monitoring. In the service identification phase, services are identified by applying criteria that, for example, qualify aspects of business models as services. In the service specification phase, operations, dependencies, functional behaviors and non-functional behaviors of services are defined. In the service realization phase, services are developed by creating design models that indicate how services are realized. In the service implementation and monitoring phase, services are hosted and managed.

As used herein, a data occurrence is defined to be a property of a data element of a service, where the property includes a first indication that the data element of the service is optional or a second indication that the data element of the service is mandatory. As used herein, a data element that is optional is defined as a data element of a service, where the data element is sourced (i.e., populated) by the service itself, and where the data element is not required to be populated by a consumer application that consumes the service or by an application that invokes the service. As used herein, a data element that is mandatory is defined as a data element of a service where the data element is required to be populated by a consumer application that consumes the service or by an application that invokes the service.

System for Specifying a Data Occurrence

Figure 1:
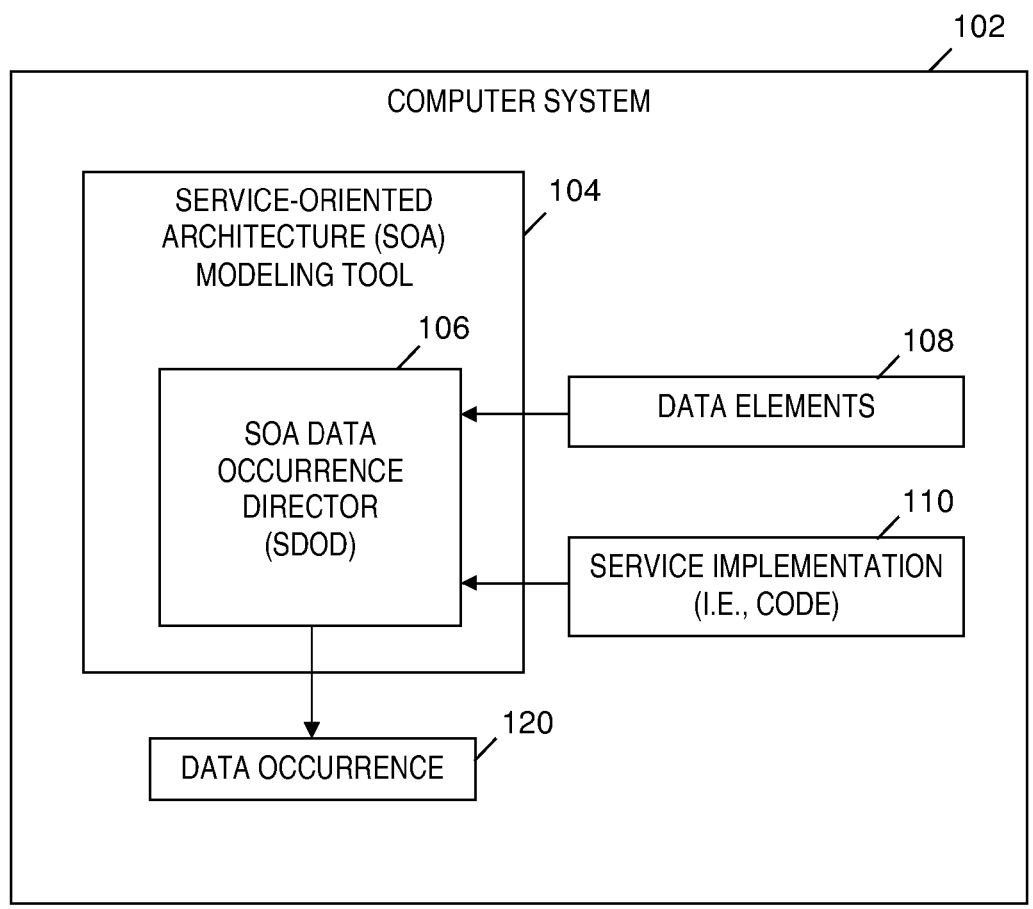
FIG. 1 is a block diagram of a system for automatically specifying a data occurrence in a service-oriented architecture based environment, in accordance with embodiments of the present invention.

FIG. 1 is a block diagram of a system for automatically specifying a data occurrence in a SOA based environment. A computer system 102 includes a software-based SOA modeling tool 104. Tool 104 may be, for example, WebSphere® Integration Developer (WID), which is a SOA modeling tool offered by International Business Machines Corporation located in Armonk, N.Y. Tool 104 runs a software-based SOA Data Occurrence Director (SDOD) 106, which receives data elements 108 specified by an interface of a service. SDOD 106 also receives the code of the service as a service implementation 110. Using the method described below relative to FIGS. 2A-2B, SDOD 106 generates a data occurrence 120 and initiates a display of an updated service interface (a.k.a. boundary) that includes data occurrence 120.

The functionality of the components of computer system 102 is further described below relative to FIGS. 2A-2B and FIG. 4.

Process for Specifying a Data Occurrence

Figure 2A:
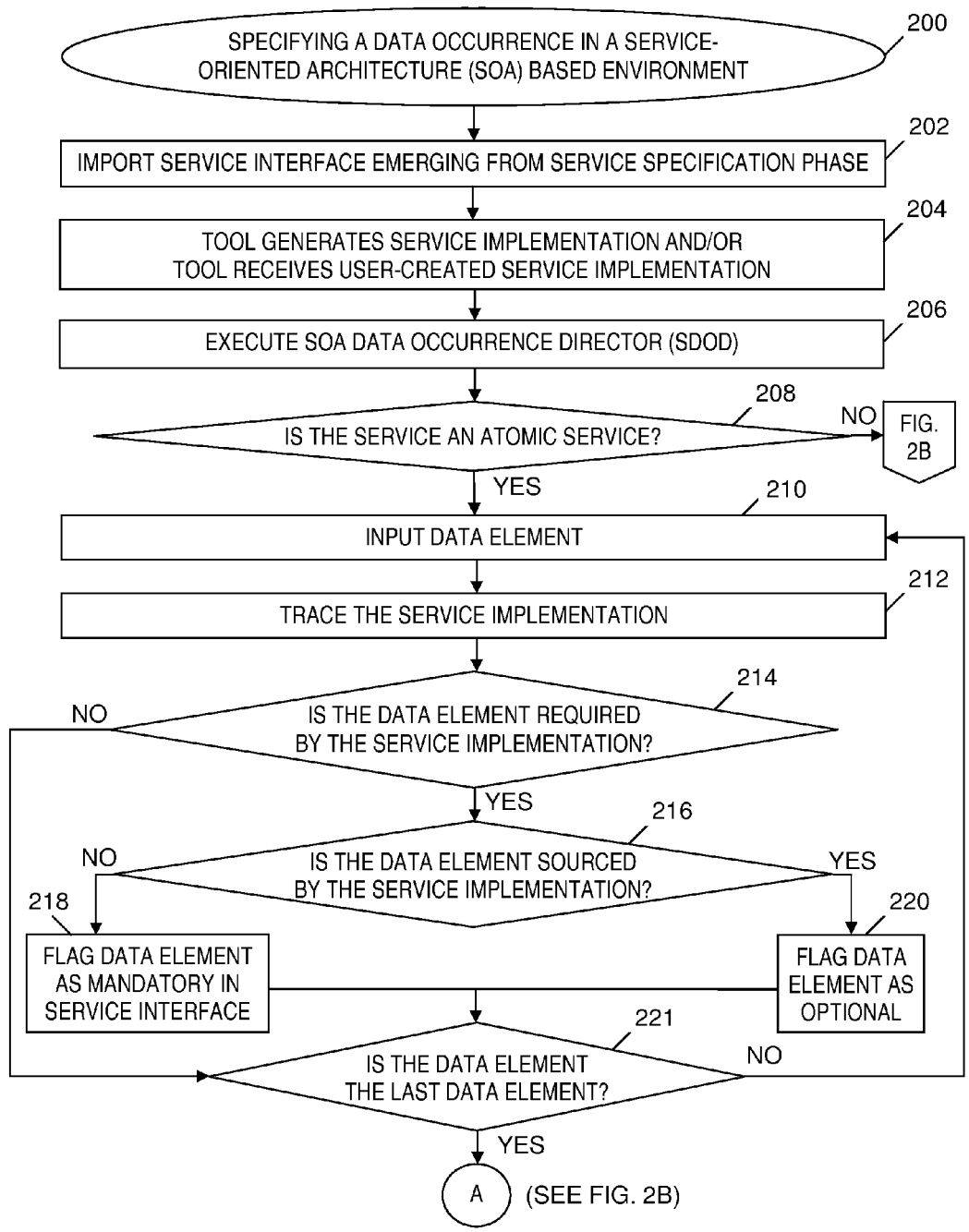
FIGS. 2A-2B depict a flowchart of a process of automatically specifying a data occurrence in a service-oriented architecture based environment, where the process is implemented in the system of FIG. 1, in accordance with embodiments of the present invention.
Figure 2B:
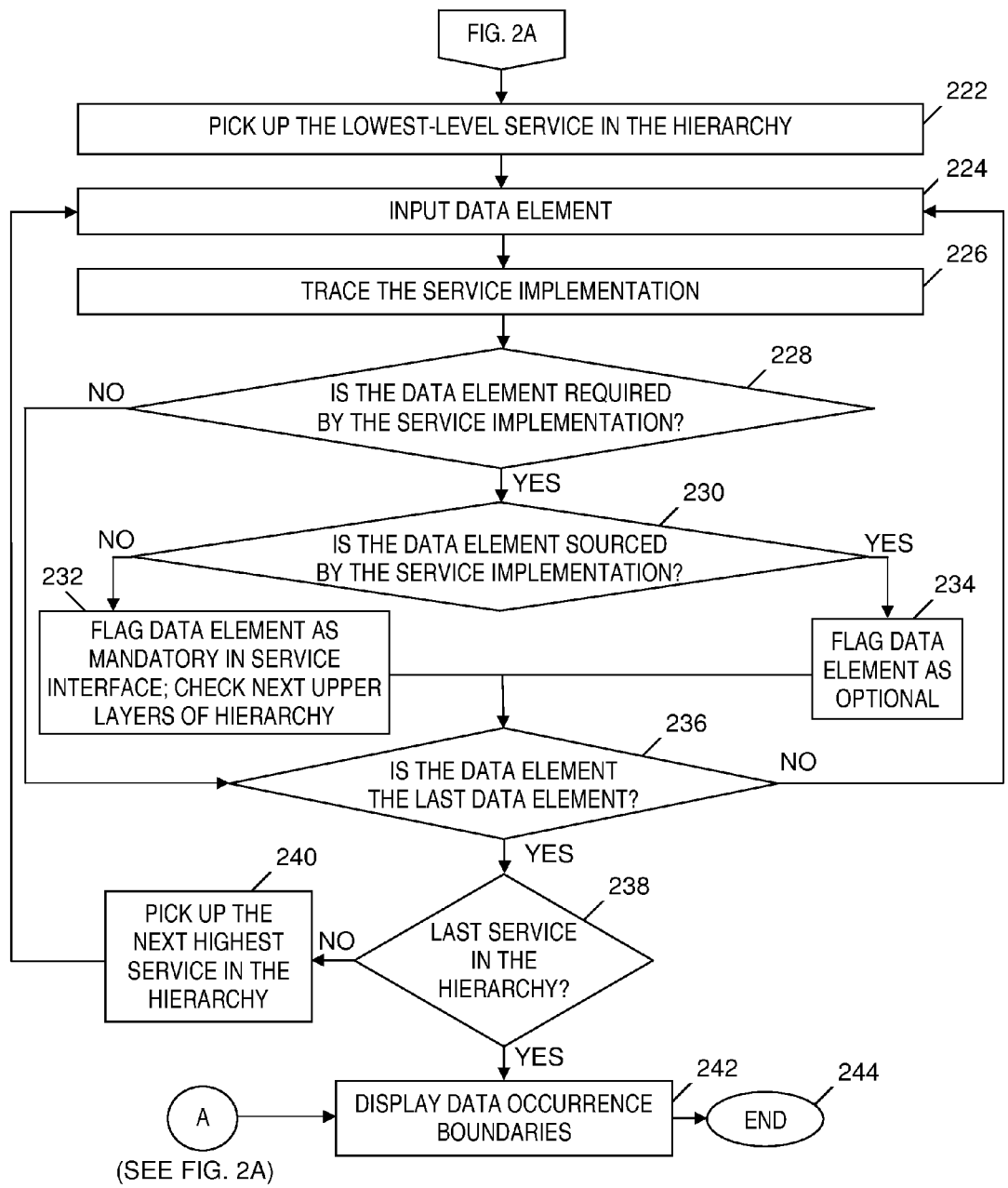

FIGS. 2A-2B depict a flowchart of a process of automatically specifying a data occurrence in a SOA based environment, where the process is implemented in the system of FIG. 1, in accordance with embodiments of the present invention. The process of automatically specifying a data occurrence in a SOA based environment begins at step 200. In step 202, SOA modeling tool 104 (see FIG. 1) imports a partially complete specification of an interface (a.k.a. service interface) of a service, where the service interface results from a service specification phase. The specification of the service interface is partially complete because its data optionality (i.e., data occurrence) is not completely specified. The data optionality of a service interface may be completely specified during and after the service realization phase, as described below, when the service hierarchy (if the service is a composite service) and the sourcing of data elements is completely known.

In step 204 in one embodiment, SOA modeling tool 104 (see FIG. 1) creates an implementation (a.k.a. service implementation) of the service (i.e., generates the code of the service). In another embodiment, SOA modeling tool 104 (see FIG. 1) receives a user-created service implementation in step 204. In step 204 in yet another embodiment, the service implementation is created as a combination of a service implementation generated by tool 104 (see FIG. 1) and a user-created service implementation received by tool 104 (see FIG. 1).

In step 206, SOA modeling tool 104 (see FIG. 1) runs SDOD 106 (see FIG. 1).

In step 208, SDOD 106 (see FIG. 1) determines whether or not the service is an atomic service. As used herein, an atomic service is defined to be a service that does not consume any other service internally to fulfill the service's intended business functionality. If SDOD 106 (see FIG. 1) determines in step 208 that the service is an atomic service, then the Yes branch of step 208 is followed and step 210 is performed.

In step 210, SDOD 106 (see FIG. 1) receives an input of a data element of the service, where the data element is included in data elements 108 (see FIG. 1).

In step 212, SDOD 106 (see FIG. 1) traces the service implementation created in step 204 by reading the code of the service included in the service implementation and determining whether the data element is used by the code.

In step 214, based on the trace in step 212, SDOD 106 (see FIG. 1) determines whether or not the data element is required by the service implementation created in step 204 (i.e., determines whether or not the processing logic of the service implementation requires the data element). If SDOD 106 (see FIG. 1) determines in step 214 that the data element is required by the service implementation, then the Yes branch of step 214 is followed and step 216 is performed.

In step 216, SDOD 106 (see FIG. 1) determines whether the data element is sourced by the service implementation. As used herein, a data element being sourced by the service implementation is defined as a data element that is populated by the service implementation itself, where the service implementation itself has the capability of retrieving the value of the data element (as opposed to requiring the application that consumes or invokes the service to populate the data element). For example, a data element is sourced by a service implementation if the data element may be obtained by the processing logic of the service implementation querying a database application. As used herein, a data element not being sourced by the service implementation is defined as a data element that is populated by an application that consumes or invokes the service.

If SDOD 106 (see FIG. 1) determines in step 216 that the data element is not sourced by the service implementation created in step 204, then the No branch of step 216 is followed and step 218 is performed. In step 218, SDOD 106 (see FIG. 1) flags the data element in the service interface to indicate that the data element is mandatory.

Returning to step 216, if SDOD 106 (see FIG. 1) determines that the data element is sourced by the service implementation, then the Yes branch of step 216 is followed and step 220 is performed.

In step 220, SDOD 106 (see FIG. 1) flags the data element in the service interface to indicate that the data element is optional.

Step 221 follows step 218 and step 220. In step 221, SDOD 106 (see FIG. 1) determines whether or not the data element is the last data element of the service to be processed by the steps of FIGS. 2A-2B. If step 221 determines that the data element is not the last data element to be processed by the steps of FIGS. 2A-2B, then the No branch of step 221 is followed and the process of FIGS. 2A-2B loops back to step 210, where the data element in the reiteration of steps 210-221 is the next data element of the service to be processed by the steps of FIGS. 2A-2B.

Returning to step 214, if SDOD 106 (see FIG. 1) determines that the data element is not required by the service implementation, then the No branch of step 214 is followed and step 221 is performed.

Returning to step 208, if SDOD 106 (see FIG. 1) determines that the service is not an atomic service, then SDOD determines that the service is a composite service, the No branch of step 208 is followed, and step 222 in FIG. 2B is performed. As used herein, a composite service is defined as a service that aggregates atomic services and/or other composite services in a hierarchical formation.

In step 222 in FIG. 2B, SDOD 106 (see FIG. 1) selects the current service being processed to be the lowest-level service in the hierarchy of the composite service determined in step 208 (see FIG. 2A).

In step 224, SDOD 106 (see FIG. 1) receives an input of a data element of the current service, where the data element is included in data elements 108 (see FIG. 1).

In step 226, SDOD 106 (see FIG. 1) traces the service implementation created in step 204 (see FIG. 2A) by reading the code of the current service included in the service implementation and determining whether the data element is used by the code.

In step 228, based on the trace in step 226, SDOD 106 (see FIG. 1) determines whether or not the data element is required by the service implementation created in step 204 (see FIG. 2A), where the service implementation is the implementation of the current service. Hereinafter, for simplicity, the service implementation that is the implementation of the current service is referred to as the current service implementation. If SDOD 106 (see FIG. 1) determines in step 228 that the data element is required by the current service implementation, then the Yes branch of step 228 is followed and step 230 is performed.

In step 230, SDOD 106 (see FIG. 1) determines whether the data element is sourced by the current service implementation. If SDOD 106 (see FIG. 1) determines in step 230 that the data element is not sourced by the current service implementation, then the No branch of step 230 is followed and step 232 is performed.

In step 232, SDOD 106 (see FIG. 1) flags the data element in the interface of the current service (a.k.a. current service interface) to indicate that the data element is mandatory. In one embodiment in the case of a composite service, a data element is mandatory based on the input of one service in one layer of the composite service's hierarchy being driven by the output of another service in a higher layer of the hierarchy. In step 232, SDOD 106 (see FIG. 1) also checks the next higher layer of the hierarchy which consumes the current service in order to determine if the data element is used in the next higher layer, and determines whether the data element at the next higher layer is sourced by the service implementation or by another application. That is, the steps of 228, 230 and depending on the determination in step 230, either step 232 or step 234 are performed for the data element at the next higher layer.

Returning to step 230, if SDOD 106 (see FIG. 1) determines that the data element is sourced by the current service implementation, then the Yes branch of step 230 is followed and step 234 is performed.

In step 234, SDOD 106 (see FIG. 1) flags the data element in the current service interface to indicate that the data element is optional.

Step 236 follows step 232 and step 234. In step 236, SDOD 106 (see FIG. 1) determines whether or not the data element is the last data element of the current service to be processed by the steps of FIGS. 2A-2B. If step 236 determines that the data element is not the last data element of the current service to be processed by the steps of FIGS. 2A-2B, then the No branch of step 236 is followed and the process of FIGS. 2A-2B loops back to step 224, where the data element in the reiteration of steps 224-236 is the next data element of the current service to be processed by the steps of FIGS. 2A-2B.

If SDOD 106 (see FIG. 1) determines in step 236 that the data element is the last data element of the current service to be processed by the steps of FIGS. 2A-2B, then the Yes branch of step 236 is followed and step 238 is performed.

In step 238, SDOD 106 (see FIG. 1) determines whether the current service is the last service in the hierarchy of the composite service determined in step 208 (see FIG. 2A). If SDOD 106 (see FIG. 1) determines in step 238 that the current service is not the last service in the hierarchy, then the No branch of step 238 is followed and step 240 is performed.

In step 240, SDOD 106 (see FIG. 1) selects the next highest service in the hierarchy of the composite service determined in step 208 (see FIG. 2A) and the process loops back to step 224, where the data element input in the reiteration of steps 224-236 until the Yes branch of step 236 is taken again is a data element of the next highest service selected in step 240.

Returning to step 238, if SDOD 106 (see FIG. 1) determines that the current service is the last service in the hierarchy of the composite service determined in step 208 (see FIG. 2A), then the Yes branch of step 238 is followed and step 242 is performed.

In step 242, SDOD 106 (see FIG. 1) initiates a display of one or more boundaries (i.e., service interfaces) that include indications of data occurrences. Each data occurrence specifies whether a corresponding data element is optional or mandatory according to the flagging of the data element included in the steps of FIGS. 2A-2B. In step 244, the process of FIGS. 2A-2B ends.

Returning to step 228, if SDOD 106 (see FIG. 1) determines that the data element is not required by the current service implementation, then the No branch of step 228 is followed and step 236 is performed, as described above.

Returning to step 221 in FIG. 2A, if SDOD 106 (see FIG. 1) determines that the data element is the last data element of the atomic service determined in step 208 (see FIG. 2A), then the process continues with step 242 of FIG. 2B.

Following the process of FIGS. 2A-2B, computer system 102 (see FIG. 1) reiterates the service specification phase based on the one or more data occurrences determined in the process FIGS. 2A-2B. As a result of reiterating the service specification phase, computer system 102 (see FIG. 1) modifies the service interface(s) based on the data occurrence(s) determined in the process of FIGS. 2A-2B. In one embodiment, computer system 102 (see FIG. 1) reiterates the service specification phase and modifies a service interface to indicate the data element(s) that are mandatory according to the flagging that occurs in step 218 (see FIG. 2A) or step 232 (see FIG. 2B), thereby creating a robust service interface.

EXAMPLE

Figure 3:
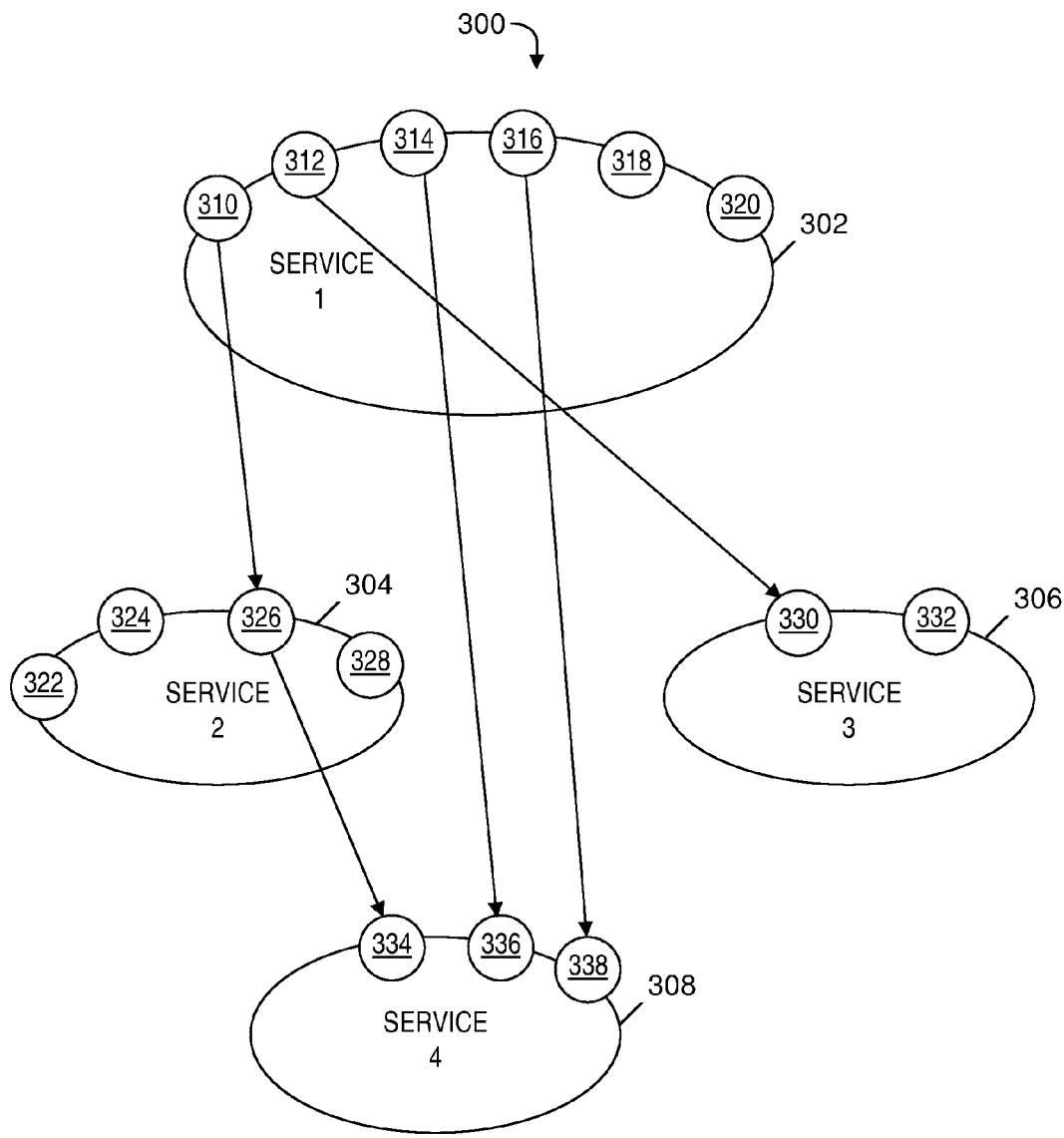
FIG. 3 is a sample hierarchy of a composite service whose data elements are input into the process of FIGS. 2A-2B, in accordance with embodiments of the present invention.

FIG. 3 is a sample hierarchy of a composite service whose data elements are input into the process of FIGS. 2A-2B, in accordance with embodiments of the present invention. Hierarchy 300 includes a service 302 (i.e., Service 1), that is dependent on a service 304 (i.e., Service 2) and on a service 306 (i.e., Service 3). Hierarchy also includes a service 308 (i.e., Service 4) on which Service 2 is dependent. Service 1 includes data elements 310, 312, 314, 316, 318 and 320. Service 2 includes data elements 322, 324, 326 and 328. Service 3 includes data elements 330 and 332. Service 4 includes data elements 334, 336 and 338.

An arrow in FIG. 3 connecting a first data element of a first service in a higher layer of hierarchy 300 to a second data element of a second service in a lower layer of hierarchy 300 indicates that the first service consumes the second service, that the first service needs to populate the second data element of the second service in order to consume the second service, and that the first data element and the second data element are logically identical. For example, the arrow from data element 326 to data element 334 indicates that Service 2 consumes Service 4, Service 2 needs to populate data element 334 in order to consume Service 4, and data element 326 and data element 334 are logically the same.

SDOD 106 (see FIG. 1) selects and checks the lowest level service (i.e., Service 4) in hierarchy 300 (see step 222 in FIG. 2B). The SDOD receives input (see step 226 in FIG. 2B) of every data element in Service 4 and checks if the processing logic of Service 4 uses the received data element (see step 228 in FIG. 2B). The SDOD initiates a display of "data element 334 is required by the implementation and hence needs to be mandatory; as this service is a layered hierarchy, checking the next level, i.e., Service 2" (see steps 230 and 232 in FIG. 2B).

The SDOD checks whether data element 334 is used by the service (i.e., Service 2) at the next higher layer of hierarchy 300, and whether data element 334 is sourced by the service implementation at the next higher layer, or sourced from another application. If data element 334 is sourced from another application, and is not used by the service implementation, then the SDOD flags the data element 334 as mandatory on the service boundary of Service 4 (see step 232 in FIG. 2B).

If data element 334 is used for the processing logic of Service 2 (i.e., the service at the next higher layer of hierarchy 300), but not sourced from another application, then SDOD suggests manifestation of the data element as data element 326, and proceeding with the next higher layer of hierarchy 300 and proceeds with running the same algorithm including steps 228, 230 and 232 or 234 until the service at the next higher layer is the service at the highest level of hierarchy 300 (i.e., Service 1). After the aforementioned algorithm is completed for all members of the hierarchy 300, SDOD initiates a display that highlights the boundaries to mandate the data elements. The Service designer feeds the information in the display about the mandated data elements back to computer system 102 (see FIG. 1) to modify and align the service interface. That is, although the service implementations of Service 1 and Service 2 may not use a data element, and Service 1 and Service 2 do not have the capability to source the data element, Service 1 and Service 2 need to manifest the data element as mandatory because Service 4 needs the data element.

Computer System

Figure 4:
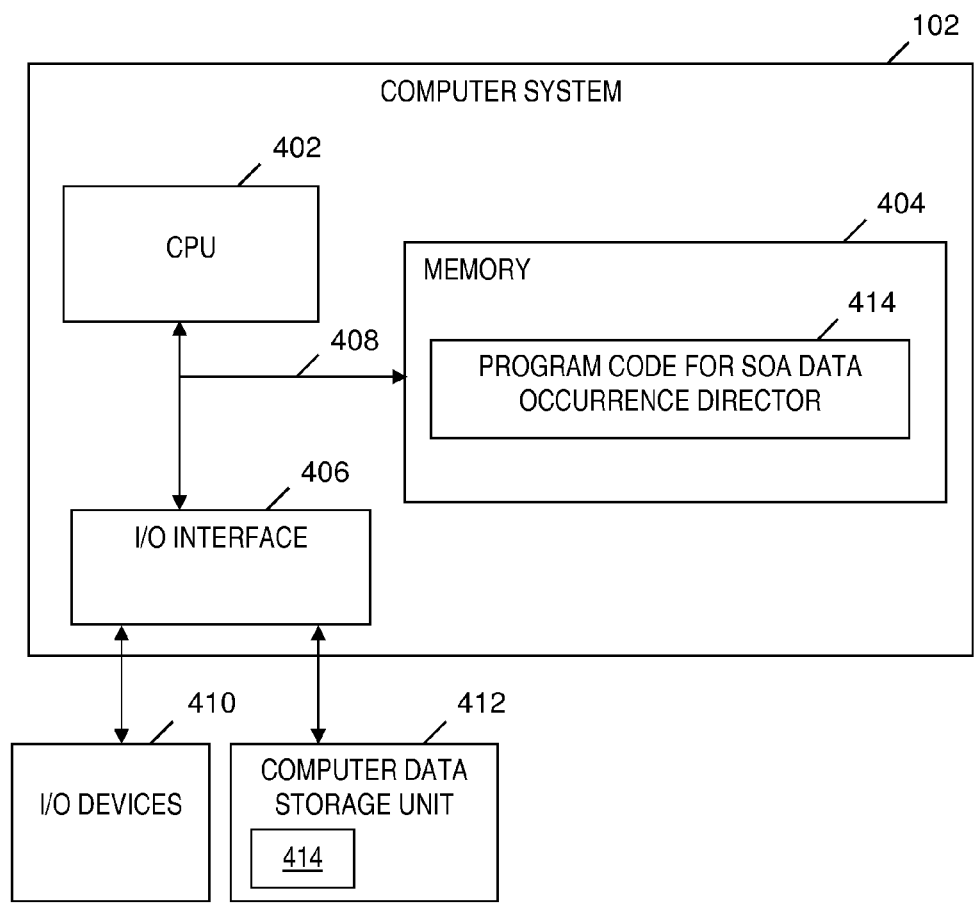
FIG. 4 is a block diagram of a computer system that is included in the system of FIG. 1 and that implements the process of FIGS. 2A-2B, in accordance with embodiments of the present invention.

FIG. 4 is a block diagram of a computer system that is included in the system of FIG. 1 and that implements the process of FIGS. 2A-2B, in accordance with embodiments of the present invention. Computer system 102 generally comprises a central processing unit (CPU) 402, a memory 404, an input/output (I/O) interface 406, and a bus 408. Further, computer system 102 is coupled to I/O devices 410 and a computer data storage unit 412. CPU 402 performs computation and control functions of computer system 102, including carrying out instructions included in program code 414 for the SDOD, where the program code 414 performs a method of specifying a data occurrence in a SOA based environment, and where the instructions are carried out by CPU 402 via memory 404. CPU 402 may comprise a single processing unit, or be distributed across one or more processing units in one or more locations (e.g., on a client and server).

Memory 404 may comprise any known computer-readable storage medium, which is described below. In one embodiment, cache memory elements of memory 404 provide temporary storage of at least some program code (e.g., program code 414) in order to reduce the number of times code must be retrieved from bulk storage while instructions of the program code are carried out. Moreover, similar to CPU 402, memory 404 may reside at a single physical location, comprising one or more types of data storage, or be distributed across a plurality of physical systems in various forms. Further, memory 404 can include data distributed across, for example, a local area network (LAN) or a wide area network (WAN).

I/O interface 406 comprises any system for exchanging information to or from an external source. I/O devices 410 comprise any known type of external device, including a display device (e.g., monitor), keyboard, mouse, printer, speakers, handheld device, facsimile, etc. Bus 408 provides a communication link between each of the components in computer system 102, and may comprise any type of transmission link, including electrical, optical, wireless, etc.

I/O interface 406 also allows computer system 102 to store information (e.g., data or program instructions such as program code 414) on and retrieve the information from computer data storage unit 412 or another computer data storage unit (not shown). Computer data storage unit 412 may comprise any known computer-readable storage medium, which is described below. For example, computer data storage unit 412 may be a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are carried out by CPU 402 via memory 404 to specify a data occurrence in a SOA based environment. Although FIG. 4 depicts memory 404 as including program code 414, the present invention contemplates embodiments in which memory 404 does not include all of code 414 simultaneously, but instead at one time includes only a portion of code 414.

Further, memory 404 may include other systems not shown in FIG. 4, such as an operating system (e.g., Linux) that runs on CPU 402 and provides control of various components within and/or connected to computer system 102.

Storage unit 412 and/or one or more other computer data storage units (not shown) that are coupled to computer system 102 may store data elements 108 (see FIG. 1), service implementation 110 (see FIG. 1), and data occurrence 120 (see FIG. 1).

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable medium(s) (e.g., memory 404 and/or computer data storage unit 412) having computer-readable program code (e.g., program code 414) embodied or stored thereon.

Any combination of one or more computer-readable mediums (e.g., memory 404 and computer data storage unit 412) may be utilized. The computer readable medium may be a computer-readable signal medium or a computer-readable storage medium. In one embodiment, the computer-readable storage medium is a computer-readable storage device or computer-readable storage apparatus. A computer-readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible medium that can contain or store a program (e.g., program 414) for use by or in connection with a system, apparatus, or device for carrying out instructions.

A computer readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 414) embodied on a computer-readable medium may be transmitted using any appropriate medium, including but not limited to wireless, wireline, optical fiber cable, RF, etc., or any suitable combination of the foregoing.

Computer program code (e.g., program code 414) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 4. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 2A-2B) and/or block diagrams of methods, apparatus (systems) (e.g., FIG. 1 and FIG. 4), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 414). These computer program instructions may be provided to one or more hardware processors (e.g., CPU 402) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 404 or computer data storage unit 412) that can direct a computer (e.g., computer system 102), other programmable data processing apparatus, or other devices to function in a particular manner, such that the instructions (e.g., program 414) stored in the computer-readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 414) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to specifying a data occurrence in a SOA based environment. Thus, an embodiment of the present invention discloses a process for supporting computer infrastructure, wherein the process comprises providing at least one support service for at least one of integrating, hosting, maintaining and deploying computer-readable code (e.g., program code 414) in a computer system (e.g., computer system 102) comprising one or more processors (e.g., CPU 402), wherein the processor(s) carry out instructions contained in the code causing the computer system to specify a data occurrence in a SOA based environment.

In another embodiment, the invention provides a method that performs the process steps of the invention on a subscription, advertising and/or fee basis. That is, a service provider, such as a Solution Integrator, can offer to create, maintain, support, etc. a process of specifying a data occurrence in a SOA based environment. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowchart in FIGS. 2A-2B and the block diagrams in FIG. 1 and FIG. 4 illustrate the architecture, functionality, and operation of possible implementations of systems, methods, and computer program products according to various embodiments of the present invention. In this regard, each block in the flowchart or block diagrams may represent a module, segment, or portion of code (e.g., program code 414), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of specifying a data occurrence in a service-oriented architecture (SOA) based environment, the method comprising the steps of:
   a computer receiving a tentative specification of an interface (service interface) of a service in the SOA based environment based on a completion of an initial service specification phase of the service;
   after the initial service specification phase and during a service realization phase of the service, the computer making a determination about a source of a data element of the service, wherein a result of the step of making the determination is determining the data element of the service is sourced or not sourced by an implementation (service implementation) of the service;
   the computer determining the data element is optional if the step of making the determination results in determining the data element is sourced by the service implementation;
   the computer determining the data element is mandatory if the step of making the determination results in determining the data element is not sourced by the service implementation;
   the computer initiates a display of the data occurrence, wherein the data occurrence includes an indication that the data element is optional if the step of making the determination results in determining the data element is sourced by the service implementation or an indication that the data element is mandatory if the step of making the determination results in determining the data element is not sourced by the service implementation;
   repeating the service specification phase based on the display of the data occurrence; and
   in response to repeating the service specification phase, the computer modifying the specification of the service interface based on the display of the data occurrence; and
   the computer determining the type of service; the computer receiving an input of the data element; the computer tracing the service implementation; and the computer determining the data element is required by the service implementation based on the step of tracing the service implementation, wherein the step of making the determination about the source of the data element of the service is performed in response to the step of determining the data element is required by the service implementation.

2. The method of claim 1, further comprising the steps of: the computer determining the service is an atomic service.

3. The method of claim 2, further comprising the steps of: the computer determining the data element is not a last data element of the service; and responsive to the step of determining the data element is not the last data element of the service, the computer repeating the steps of receiving the input, tracing the service implementation, determining the data element is required, and making the determination about dependencies of the service with the data element replaced by a next data element of the service.

4. The method of claim 1, further comprising the steps of: the computer determining the service is a composite service having a plurality of services in a plurality of levels of a hierarchy; wherein the service is at a lowest level of the hierarchy.

5. The method of claim 4, further comprising the steps of: the computer determining the data element is not a last data element of the service; and responsive to the step of determining the data element is not the last data element of the service, the computer repeating the steps of receiving the input, tracing the service implementation, determining the data element is required, and making the determination about the source of the data element of the service with the data element replaced by a next data element of the service.

6. The method of claim 4, further comprising the steps of: the computer determining the data element is a last data element of the service; the computer determining the service is not a last service in the hierarchy; responsive to the step of determining the service is not a last service, the computer selecting a next service in the hierarchy, wherein the next service is a next highest service in the hierarchy; and responsive to the step of determining the service is not the last service, the computer repeating the steps of receiving the input, tracing the service implementation, determining the data element is required, and making the determination about the source of the data element of the service, with the service replaced by the next service in the hierarchy.

7. A computer system comprising:
   a central processing unit (CPU);
   a memory coupled to the CPU;
   a computer-readable, storage medium coupled to the CPU, the storage device containing instructions that are carried out by the CPU via the memory to implement a method of specifying a data occurrence in a service-oriented architecture (SOA) based environment, the method comprising the steps of:
   receiving a tentative specification of an interface (service interface) of a service in the SOA based environment based on a completion of an initial service specification phase of the service;
   after the initial service specification phase and during a service realization phase of the service, making a determination about a source of a data element of the service, wherein a result of the step of making the determination is determining the data element of the service is sourced or not sourced by an implementation (service implementation) of the service;
   determining the data element is optional if the step of making the determination results in determining the data element is sourced by the service implementation;
   determining the data element is mandatory if the step of making the determination results in determining the data element is not sourced by the service implementation;
   initiates a display of the data occurrence, wherein the data occurrence includes an indication that the data element is optional if the step of making the determination results in determining the data element is sourced by the service implementation or an indication that the data element is mandatory if the step of making the determination results in determining the data element is not sourced by the service implementation;
   repeating the service specification phase based on the display of the data occurrence; and in response to repeating the service specification phase, modifying the specification of the service interface based on the display of the data occurrence; and
   determining the type of service; receiving an input of the data element; tracing the service implementation; and determining the data element is required by the service implementation based on the step of tracing the service implementation, wherein the step of making the determination about the source of the data element of the service is performed in response to the step of determining the data element is required by the service implementation.

8. The computer system of claim 7, wherein the method further comprises the steps of: determining the service is an atomic service.

9. The computer system of claim 8, wherein the method further comprises the steps of: determining the data element is not a last data element of the service; and responsive to the step of determining the data element is not the last data element of the service, repeating the steps of receiving the input, tracing the service implementation, determining the data element is required, and making the determination about the source of the data element of the service, with the data element replaced by a next data element of the service.

10. The computer system of claim 7, wherein the method further comprises the steps of: determining the service is a composite service having a plurality of services in a plurality of levels of a hierarchy; wherein the service is at a lowest level of the hierarchy.

11. The computer system of claim 10, wherein the method further comprises the steps of: determining the data element is not a last data element of the service; and responsive to the step of determining the data element is not the last data element of the service, repeating the steps of receiving the input, tracing the service implementation, determining the data element is required, and making the determination about the source of the data element of the service, with the data element replaced by a next data element of the service.

12. The computer system of claim 10, wherein the method further comprises the steps of: determining the data element is a last data element of the service; determining the service is not a last service in the hierarchy; responsive to the step of determining the service is not a last service, selecting a next service in the hierarchy, wherein the next service is a next highest service in the hierarchy; and responsive to the step of determining the service is not the last service, repeating the steps of receiving the input, tracing the service implementation, determining the data element is required, and making the determination about the source of the data element of the service with the service replaced by the next service in the hierarchy.

13. A computer program product, comprising:
a computer-readable storage medium having a computer-readable program code stored therein, the computer-readable program code containing instructions that are carried out by a central processing unit (CPU) of a computer system to implement a method of specifying a data occurrence in a service-oriented architecture (SOA) based environment, the method comprising the steps of:
receiving a tentative specification of an interface (service interface) of a service in the SOA based environment based on a completion of an initial service specification phase of the service;
after the initial service specification phase and during a service realization phase of the service, making a determination about a source of a data element of the service, wherein a result of the step of making the determination is determining the data element of the service is sourced or not sourced by an implementation (service implementation) of the service;
determining the data element is optional if the step of making the determination results in determining the data element is sourced by the service implementation;
determining the data element is mandatory if the step of making the determination results in determining the data element is not sourced by the service implementation;
initiates a display of the data occurrence, wherein the data occurrence includes an indication that the data element is optional if the step of making the determination results in determining the data element is sourced by the service implementation or an indication that the data element is mandatory if the step of making the determination results in determining the data element is not sourced by the service implementation;
repeating the service specification phase based on the display of the data occurrence; and
in response to repeating the service specification phase, modifying the specification of the service interface based on the display of the data occurrence; and
determining the type of service; receiving an input of the data element; tracing the service implementation; and determining the data element is required by the service implementation based on the step of tracing the service implementation, wherein the step of making the determination about the source of the data element of the service is performed in response to the step of determining the data element is required by the service implementation.

14. The program product of claim 13, wherein the method further comprises the steps of: determining the service is an atomic service.

15. The program product of claim 14, wherein the method further comprises the steps of: determining the data element is not a last data element of the service; and responsive to the step of determining the data element is not the last data element of the service, repeating the steps of receiving the input, tracing the service implementation, determining the data element is required, and making the determination about the source of the data element of the service with the data element replaced by a next data element of the service.

16. The program product of claim 13, wherein the method further comprises the steps of: determining the service is a composite service having a plurality of services in a plurality of levels of a hierarchy; wherein the service is at a lowest level of the hierarchy.

17. The program product of claim 16, wherein the method further comprises the steps of: determining the data element is not a last data element of the service; and responsive to the step of determining the data element is not the last data element of the service, repeating the steps of receiving the input, tracing the service implementation, determining the data element is required, and making the determination about the source of the data element of the service with the data element replaced by a next data element of the service.

18. The program product of claim 16, wherein the method further comprises the steps of: determining the data element is a last data element of the service; determining the service is not a last service in the hierarchy; responsive to the step of determining the service is not a last service, selecting a next service in the hierarchy, wherein the next service is a next highest service in the hierarchy; and responsive to the step of determining the service is not the last service, repeating the steps of receiving the input, tracing the service implementation, determining the data element is required, and making the determination about the source of the data element of the service with the service replaced by the next service in the hierarchy.

19. A process for supporting computing infrastructure, the process comprising providing at least one support service for at least one of creating, integrating, hosting, maintaining, and deploying computer-readable code in a computer comprising a central processing unit (CPU), wherein the CPU carries out instructions contained in the code causing the computer to perform a method of specifying a data occurrence in a service-oriented architecture (SOA) based environment, wherein the method comprises:

the computer receiving a tentative specification of an interface (service interface) of a service in the SOA based environment based on a completion of an initial service specification phase of the service;

after the initial service specification phase and during a service realization phase of the service, the computer making a determination about a source of a data element of the service, wherein a result of the step of making the determination is determining the data element of the service is sourced or not sourced by an implementation (service implementation) of the service;

the computer determining the data element is optional if the step of making the determination results in determining the data element is sourced by the service implementation;

the computer determining the data element is mandatory if the step of making the determination results in determining the data element is not sourced by the service implementation;

the computer initiates a display of the data occurrence, wherein the data occurrence includes an indication that the data element is optional if the step of making the determination results in determining the data element is sourced by the service implementation or an indication that the data element is mandatory if the step of making the determination results in determining the data element is not sourced by the service implementation;

repeating the service specification phase based on the display of the data occurrence; and in response to repeating the service specification phase, the computer modifying the specification of the service interface based on the display of the data occurrence; and the computer determining the type of service; the computer receiving an input of the data element; the computer tracing the service implementation; and the computer determining the data element is required by the service implementation based on the step of tracing the service implementation, wherein the step of making the determination about the source of the data element of the service is performed in response to the step of determining the data element is required by the service implementation.

20. The process of claim 19, wherein the method further comprises the steps of: the computer determining the service is an atomic service.

* * * * *